(12) United States Patent
Ikeda et al.

(10) Patent No.: US 6,897,996 B2
(45) Date of Patent: May 24, 2005

(54) ELECTROPHORETIC DISPLAY DEVICE (75) Inventors: Tsutomu Ikeda, Tokyo (JP); Nobutaka Ukigaya, Kanagawa (JP); Koichi Ishige, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 10/234,456

(22) Filed: Sep. 5, 2002

(65) Prior Publication Data

US 2003/0048521 A1 Mar. 13, 2003

(30) Foreign Application Priority Data

Sep. 12, 2001 (JP) ........................................ 2001-276442
Aug. 8, 2002 (JP) ........................................ 2002-231424

(51) Int. Cl.⁷ ........................... G02B 26/00; G09G 3/34; G03G 17/04
(52) U.S. Cl. ........................... 359/296; 345/107; 430/32; 204/450
(58) Field of Search ................................. 359/529, 530, 359/536, 538, 539, 298, 237–296, 541; 345/84, 85, 87, 88, 107, 86; 349/78–84, 92, 86, 89; 430/32

(56) References Cited

U.S. PATENT DOCUMENTS

| 3,612,758 | A | | 10/1971 | Evans ....................... 178/5.4 R |
| 6,072,621 | A | | 6/2000 | Kishi et al. .................. 359/296 |
| 6,184,856 | B1 | * | 2/2001 | Gordon et al. ............... 345/107 |
| 6,221,267 | B1 | | 4/2001 | Ikeda et al. .................... 216/24 |
| 6,225,971 | B1 | * | 5/2001 | Gordon et al. ............... 345/107 |
| 6,271,823 | B1 | * | 8/2001 | Gordon et al. ............... 345/107 |
| 6,377,757 | B1 | * | 4/2002 | Matsuura et al. ............... 399/1 |
| 6,515,790 | B1 | * | 2/2003 | Miyamoto et al. .......... 359/296 |
| 6,525,865 | B1 | | 2/2003 | Katase ........................ 359/296 |
| 6,680,726 | B1 | * | 1/2004 | Gordon et al. ............... 345/107 |
| 2001/0009352 | A1 | * | 7/2001 | Moore ......................... 313/582 |
| 2001/0024577 | A1 | * | 9/2001 | Matsuura et al. ............... 399/2 |
| 2002/0171619 | A1 | * | 11/2002 | Gordon et al. ............... 345/107 |
| 2002/0171620 | A1 | * | 11/2002 | Gordon et al. ............... 345/107 |
| 2003/0007238 | A1 | * | 1/2003 | Liang et al. ................. 359/296 |
| 2003/0035199 | A1 | * | 2/2003 | Liang et al. ................. 359/296 |
| 2003/0043450 | A1 | * | 3/2003 | Liang et al. ................. 359/296 |
| 2003/0048521 | A1 | * | 3/2003 | Ikeda et al. .................. 359/296 |
| 2003/0053190 | A1 | * | 3/2003 | Liang et al. ................. 359/296 |
| 2003/0132908 | A1 | * | 7/2003 | Herb et al. ................... 345/107 |
| 2003/0179436 | A1 | * | 9/2003 | Liang et al. ................. 359/296 |
| 2004/0119680 | A1 | * | 6/2004 | Daniel et al. ................ 345/107 |

FOREIGN PATENT DOCUMENTS

| JP | 9-211449 | 8/1997 |
| JP | 9-211499 | 8/1997 |

* cited by examiner

Primary Examiner—John R. Lee
Assistant Examiner—Bernard E. Souw
(74) Attorney, Agent, or Firm—Fitzpatrick, Cella, Harper & Scinto (57) ABSTRACT

An electrophoretic display device is configured to move charged particles between a display electrode surface and a cell wall surface and provides a solution to a problem that many charged particles are collected at the edge of the display electrode to degrade display contrast. The electrophoretic display device is arranged to move the charged particles between the display electrode surface and the side face of the cell wall and the vicinity thereof to implement display, and the second electrode is disposed on a lower face of the cell wall or in the vicinity of the lower face, thereby allowing the particles to be located on the surface of the cell wall. Another electrophoretic display device is provided which has a structure wherein all or part of the display electrode has a protruding shape.

17 Claims, 7 Drawing Sheets

ELECTROPHORETIC DISPLAY DEVICE

BACKGROUND OF THE INVENTION

1. Field of the Invention

The present invention relates to an electrophoretic display device configured to implement display on the basis of migration of charged particles in a dispersing fluid.

2. Related Background Art

In recent years, proposals have been made on various types of electrophoretic display devices configured to implement display on the basis of migration of charged particles in a dispersing fluid. The electrophoretic display device will be described below.

With development of information equipment, there are increasing needs for low-power-consumption and low-profile display devices, and research and development is active on the display device to meet these needs. Among others, the liquid crystal display devices are actively developed and commercially available as display devices capable of meeting such needs. The current liquid crystal display devices, however, have the problem that characters on a display panel become harder to see, depending upon angles of view to the display panel and upon reflected light, and the problem that strain is heavy on the eyes because of flickering of the light source, low luminance, and so on. These problems have not been adequately solved yet. For this reason, the reflective display device is raising hopes in terms of low power consumption, reduction of the strain on the eyes, and so on.

Harold D. Lees et al. proposed the electrophoretic display device as one of such devices (U.S. Pat. No. 3,612,758).

Figure 6A:
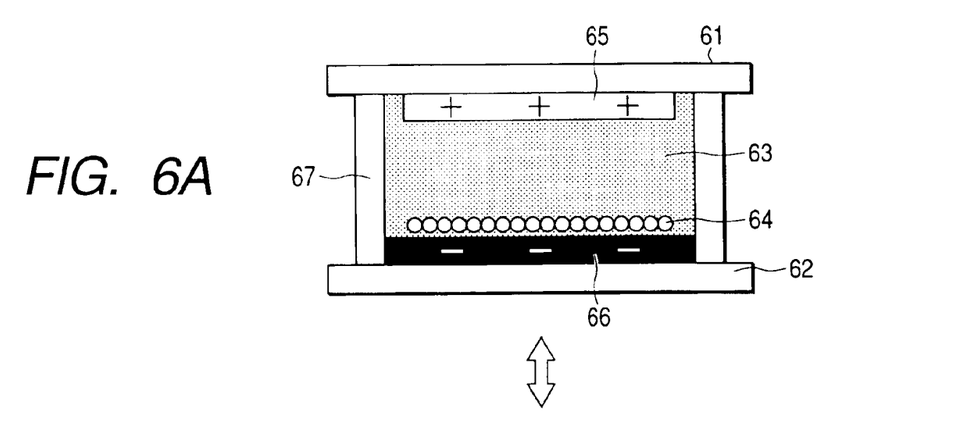
FIGS. 6A and 6B are views showing an example of the conventional electrophoretic device.

FIG. 6A is a view showing an example of the structure of the electrophoretic display device, in which the electrophoretic display device of this type is composed of a pair of substrates 61, 62 placed with a predetermined clearance between; a dispersing fluid 63 filled between these substrates 61, 62; a number of colored, charged particles 64 dispersed in the dispersing fluid 63; and display electrodes 65, 66 positioned in each pixel so as to extend along the respective substrates 61, 62.

Figure 6B:
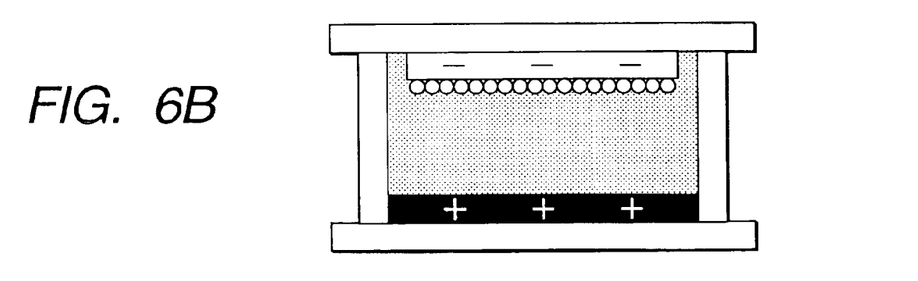

A cell wall 67 is placed between pixels to prevent the colored, charged particles 64 from migrating to the other pixels, thereby maintaining uniform display. In this device, because the colored, charged particles 64 are positively or negatively charged, either one display electrode 65 or 66 adsorbs the particles according to polarities of a voltage applied to the display electrodes 65, 66. Since the dispersing fluid 63 and the colored, charged particles 64 are colored in their respective colors different from each other, an observer visually observes the color of the particles 64 in a state in which the colored, charged particles 64 adsorb on the observer-side display electrode 65 (cf. FIG. 6B), but the observer visually observes the color of the dispersing fluid 63 in a state in which the colored, charged particles 64 adsorb on the other-side display electrode 66 (cf. FIG. 6A). Therefore, the device is able to provide display of various images on the basis of control on the polarities of the applied voltage in every pixel. Hereinafter, the device of this type will be referred to as a "vertical migration type".

In the electrophoretic device of this vertical migration type, however, the dispersing fluid 63 has to contain a color coupler such as a dye, ions, or the like, and the existence of this color coupler induces new transfer of charge. The color coupler is thus likely to act as a destabilizing factor in the electrophoretic operation and sometimes degraded the performance, lifetime, and stability of the display device.

Figure 7:
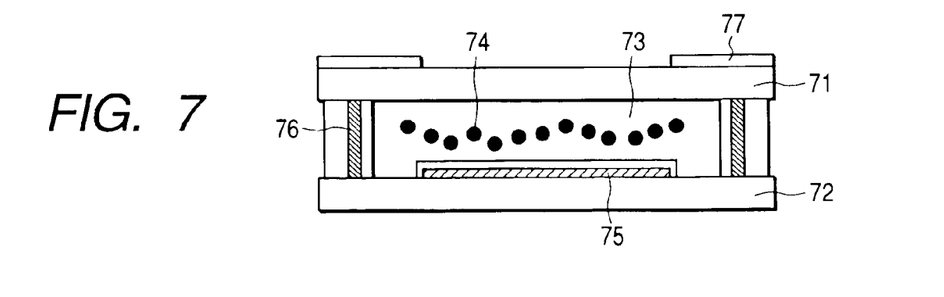
FIG. 7 is a view showing another conventional electrophoretic display device.

As a solution to this problem, Japanese Patent Application Laid-Open No. 9-211499 discloses an electrophoretic display device of the type shown in FIG. 7. The electrophoretic display device is composed of a pair of substrates 71, 72 placed with a predetermined clearance between; a dispersing fluid 73 filled between these substrates 71, 72; a number of colored, charged particles 74 dispersed in the dispersing fluid 73; and two electrodes 75, 76 placed in each pixel. The pair of electrodes 75, 76 are not placed so as to sandwich the dispersing fluid 73 between, different from the aforementioned type. The first electrode 75 is placed so as to extend along the rear-side substrate 72, while the second electrode 76 is formed in a portion covered by a shielding layer 77 provided on the front substrate 71.

In the case of the electrophoretic display device of this type, the dispersing fluid 73 can be transparent and does not have to contain a color coupler, so that the problem discussed above can be circumvented. In the device, the first electrode 75, or the surface thereof, or a color layer, which must be placed behind the first electrode 75 if the first electrode 75 is transparent, is colored in a color different from that of the charged particles 74. The charged particles 74 migrate according to the polarities of the voltage applied to the electrodes 75, 76. While the particles adsorb on the second electrode 76 below the shielding layer 77, the particles 74 are hidden under the shielding layer 77 from the observer, so that the observer does not observe the color of the charged particles 74 but visually observes the colors of the first electrode 75 and the shielding layer 77. While the charged particles 74 adsorb on the first electrode 75 on the other hand, the observer visually observes the color of the charged particles 74 and the color of the shielding layer 77. Accordingly, the device is able to provide display of an image on the basis of control on the polarities of the applied voltage in every pixel.

The electrophoretic display device described above, however, had the following problems. In Japanese Patent Application Laid-Open No. 9-211499, the first electrode 75 is provided in flat shape on the rear-side substrate 72, and the second electrode 76 is structured to be placed under the peripheral shielding layer 77. In this configuration, when an electric field is impressed between the two electrodes 75, 76 in order to move the charged particles 74, as apparent from FIG. 7, the electric field is concentrated at the part closest to the second electrode 76, in the surface of the first electrode 75, i.e., at the edge of the surface of the first electrode 75. This raised the problem that, for example, in an operation of moving the charged particles 74 present on the second electrode 76 onto the first electrode 75, many charged particles 74 migrated to the edge of the first electrode 75 and it was hard for the particles to reach the central region, thus lowering the display contrast.

Figure 8:
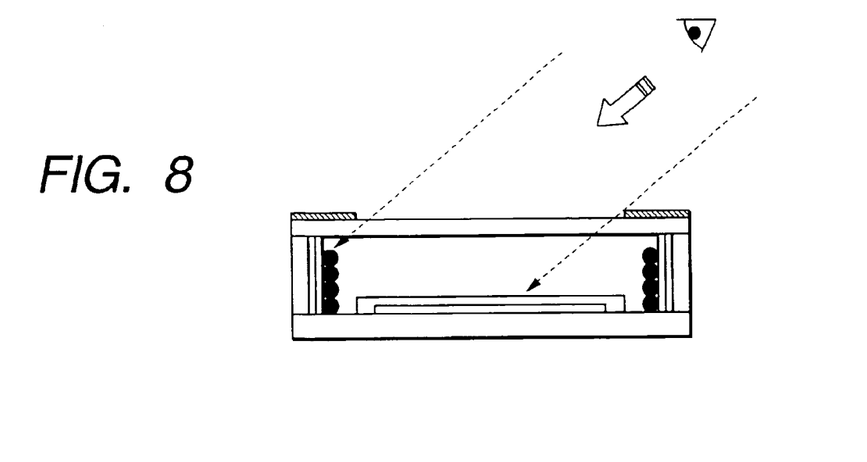
FIG. 8 is a view illustrating the influence of viewing angle in the electrophoretic device.

Furthermore, as shown in FIG. 8, the above electrophoretic display device has relatively large viewing angle dependence of the positional relation between the display layer formed on the first electrode and the shielding layer formed on the observer side of the display-side substrate. This viewing angle dependence occurs where two optical modulation layers are placed with a spacing over a definite distance in the in-depth direction, and poses problems of decrease of aperture ratio, color shift, parallax, and so on. The above conventional example also had the problem that when the observer obliquely observed the pixel, the shielding layer was projected in a large area on the surface of the first electrode to decrease the effective aperture ratio and particles on the side wall appeared exposed in part to cause mixing of colors.

Since this situation varies depending upon angles of observation, the display inevitably has great viewing angle dependence as a result. The viewing angle dependence becomes noticeable, particularly, in high definition display, and its influence becomes serious, for example, in the case of the pixel pitch of 100 µm; even if the clearance between the upper and lower substrates is controlled at 20 µm, at least the display-side substrate needs to be a plastic substrate 50 to 100 µm or more thick.

In the above application, since the shielding layer 77 is formed on the observer-side surface of the display-side substrate 71, the substrate must have some thickness, which posed the problem that each pixel display covered by the shielding layer 77 varied depending upon view.

SUMMARY OF THE INVENTION

The present invention has been accomplished in order to solve the above problems, and provides an electrophoretic display device comprising a display-side substrate and a rear-side substrate placed with a predetermined clearance between; a cell wall placed at a periphery of a pixel in order to keep the clearance constant between the two substrates; a dispersing fluid disposed in the clearance between the two substrates; a plurality of colored, charged particles dispersed in the dispersing fluid; and a first electrode and a second electrode placed in each pixel and demonstrating colors different from each other; and configured to apply a voltage between the first electrode and the second electrode to move the charged particles between a surface of the first electrode and, a side face of the cell wall and the vicinity thereof, thereby implementing display, wherein the first electrode is formed on the rear-side substrate and the second electrode is formed on the side face or a bottom face of the cell wall, or in the vicinity of the bottom face.

According to the present invention, the electrophoretic display device may be configured so that at least a portion of the first electrode has a shape protruding on a side opposite to the rear-side substrate side.

DETAILED DESCRIPTION OF THE PREFERRED EMBODIMENTS

A first embodiment of the present invention will be described below with reference to FIG. 1 to FIGS. 5A, 5B.

Figure 1:
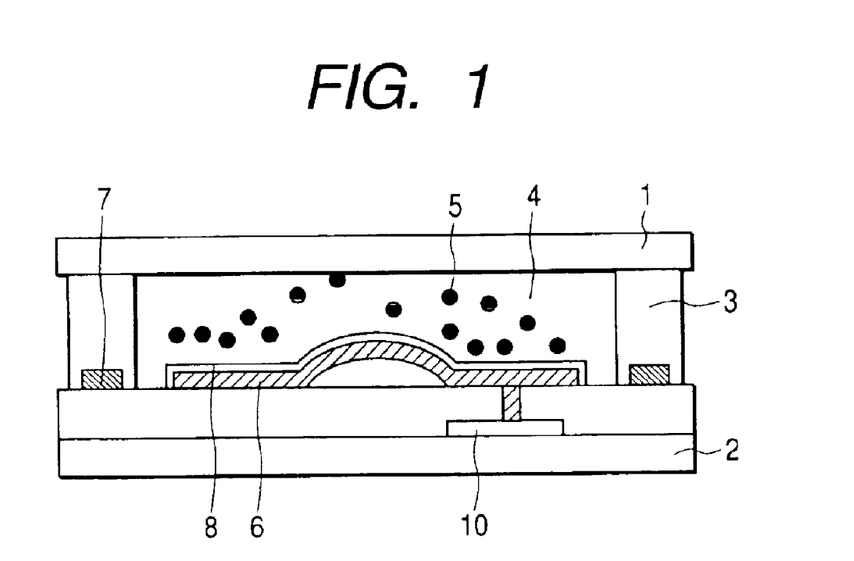
FIG. 1 is a view showing a first embodiment of the present invention.

An electrophoretic display device in accordance with the first embodiment of the present invention is composed, for example as shown in FIG. 1, of a display-side substrate and a rear-side substrate 1, 2 placed with a predetermined clearance between; a cell wall 3 for forming the clearance between the substrates 1, 2; a dispersing fluid 4 placed in a space surrounded by the substrates and the cell wall; and a plurality of colored, charged particles 5 dispersed in the dispersing fluid 4.

The first electrode 6 is placed on a surface of the rear-side substrate 2 facing the display-side substrate 1, but may also be formed on a surface of the display-side substrate 1. The first electrode 6 defines a unit of display, i.e., a pixel.

At least a portion of the first electrode 6 protrudes from the side of the substrate on which it is formed, toward the side of the facing substrate. Namely, the surface of the first electrode has different heights depending upon positions with respect to the surface of the substrate on which it is formed, and thus has a distribution of small and large heights. The term "protrusion" used in the claims and specification will refer to a deformation from a flat state of the entire surface of the first electrode into a state with the foregoing height distribution, or to a portion of the deformed first electrode which has a height larger than the other portion with respect to the substrate surface.

The protruding portion of the first electrode 6 is preferably positioned around a site where the electric field would be weakest on the first electrode 6 under application of the voltage between the first electrode 6 and the second electrode 7 if the first electrode 6 were flat. Since the electric field strength is normally weakest at the position on the first electrode 6 that is most distant from the second electrode 7, the height of the protrusion is decreased from the highest point at the most distant position toward the second electrode 7. As shown in FIG. 1, the second electrode 7 is formed on the bottom face of the cell wall placed at the periphery of the pixel, and thus the site where the electric field is weakest on the first electrode 6, must be in the vicinity of the center point of the pixel. Accordingly, the protruding portion is defined in the central region of the pixel including the center point of the pixel. The region of the protrusion is determined according to the portion where the electric field strength needs to be intensified.

There are no specific restrictions on the shape of the protrusion as long as the protrusion can intensify the electric field strength. The shape of the protrusion can be selected, for example, from a shape in which the first electrode wholly protrudes, a shape in which the first electrode protrudes in part, a shape in which the protrusion has two or more steps, etc., such as shown in FIGS. 2A to 2D.

Since the protrusion of the first electrode decreases the distance along the electric field between the surface of the first electrode and the surface of the second electrode, the electric field intensity between them is intensified thereby. However, if the heights of the protrusion are too large, the distance to the second electrode will increase on the contrary, and the electric field will become weaker against expectation.

The height of the protrusion can be determined within the range where the electric field intensity is intensified. However, in order to make a significant change in the intensity of the electric field acting on the charged particles, the height of the protrusion need to be at least several times greater than the diameters of the charged particles. Since the particles often used have the particle sizes of approximately 0.1 µm to 10 µm, the maximum height measured from the rear-side substrate surface is preferably not less than 0.5 µm and more preferably not less than 2 µm. The upper limit of the maximum height is preferably not more than the distance between the substrates and more preferably, not more than two thirds of the distance between the substrates.

When the first electrode has the protrusion, the electrode slopes toward the second electrode and thus the electric field vectors on the surface of the first electrode slope toward the second electrode. Therefore, the electric field components in the substrate surface become greater, which is more advantageous for the migration of the charged particles. The first electrode may have an insulating layer 8 formed on the surface thereof.

Figure 3:
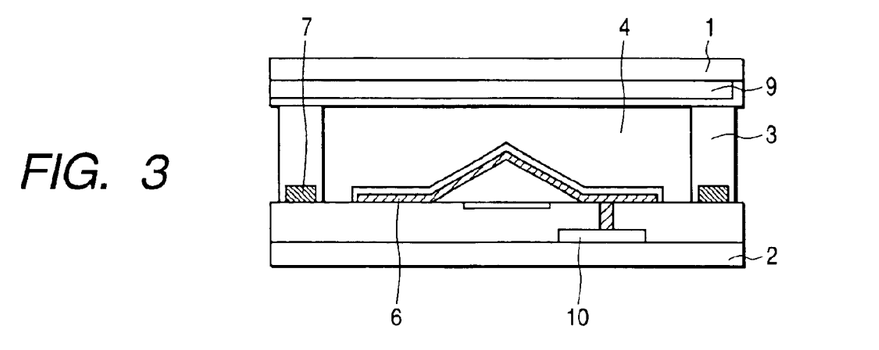
FIG. 3 is a view illustrating another embodiment of the present invention.

As shown in FIG. 3, a transparent electrode 9 may be provided on the display-side substrate 1 side. There are cases where the charged particles attach on the display-side substrate side to lower the contrast. In such cases, a voltage is applied to the transparent electrode whereby these attaching particles can be moved back to the rear-side substrate side, thereby recovering the contrast.

The second electrode 7 is located at one or more positions on the surface or inside of the cell wall 3. Namely, the second electrode 7 is located at one or more positions among a location on a side wall of the cell wall 3, i.e., on the dispersing fluid 4 side surface, a location between the cell wall 3 and the display-side substrate 1, and a location between the cell wall 3 and the rear-side substrate 2. Alternatively, the second electrode 7 may also be placed inside the cell wall 3. Furthermore, the second electrode 7 may also be located on the display-side substrate 1, on the rear-side substrate 2, or inside either of the substrates being in contact with the cell wall 3. When the second electrode is formed on the substrate, the second electrode may project out in part from the area corresponding to the bottom face of cell wall toward the first electrode. In either of the above arrangements, the charged particles 5 can be moved in the area including the surface of the first electrode 6 and, the side face of the cell wall 3 and the vicinity thereof.

The display device of the present invention is configured to apply a voltage between the first electrode 6 and the second electrode 7 to move the charged particles 5 in the area including the surface of the first electrode 6 and, the side face of the cell wall 3 and the vicinity thereof, thereby implementing display.

Figure 4A:
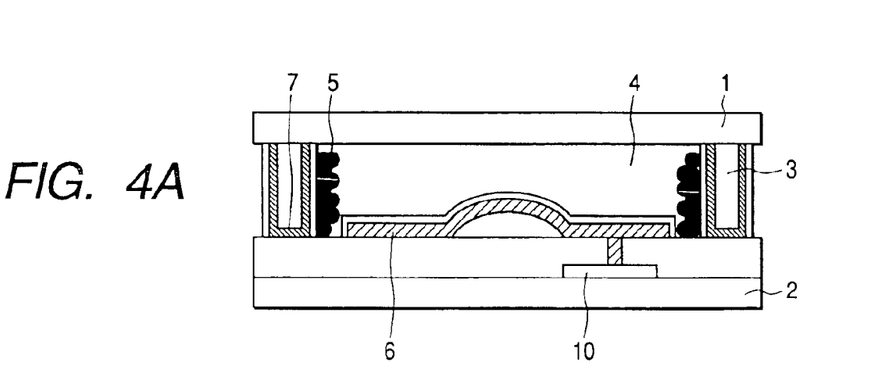
FIGS. 4A and 4B are views illustrating the operation of an electrophoretic display device of the present invention.
Figure 4B:
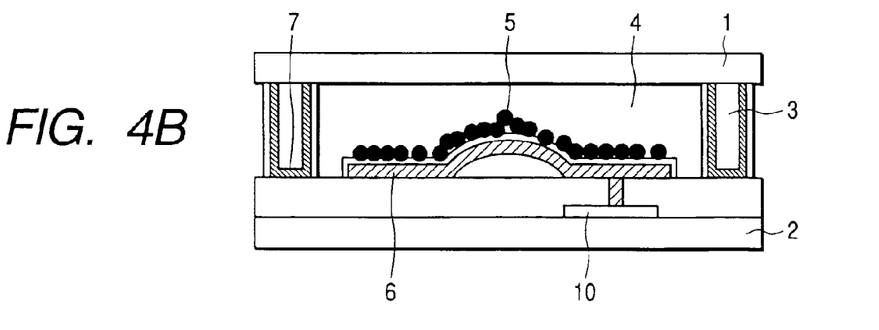
Figure 5A:
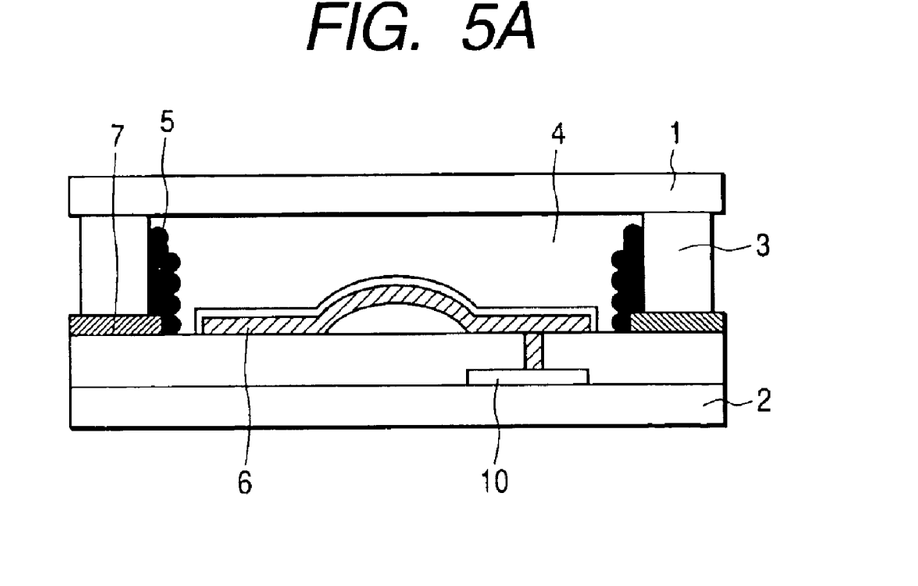
FIGS. 5A and 5B are views illustrating the operation of another electrophoretic display device of the present invention.
Figure 5B:
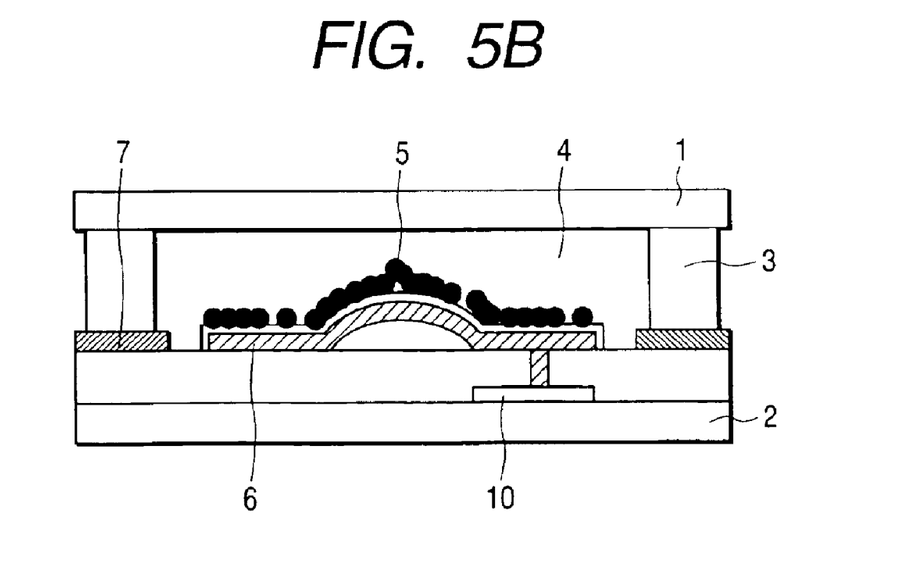

For example, as shown in FIGS. 4A and 4B, in a configuration wherein the second electrode 7 is formed in the side face of the cell wall 3, the surface of the first electrode 6 is colored in white, and the charged particles 5 are black, white display is presented in a state in which the charged particles 5 are attracted to the side face of the cell wall 3 (FIG. 4A) and black display is presented in a state in which the charged particles 5 are placed so as to cover the first electrode 6 (FIG. 4B). Further, as shown in FIGS. 5A and 5B, in another configuration wherein the second electrode 7 is formed between the cell wall 3 and the rear-side substrate 2, white display is presented when the charged particles 5 are collected in the portion surrounded by the side face of the cell wall 3 and the portion being in the vicinity of the side face of the cell wall 3 of the rear-side substrate 2 except for the portion having the first electrode 6 provided.

In either of FIG. 1 to FIGS. 5A, 5B, the cell wall 3 is formed so as to isolate the pixel from the adjacent pixels. It is unfavorable that the voltage applied to the second electrode should affect display states of the adjacent pixels, and it is thus desirable to apply a common fixed potential to the second electrodes of the adjacent pixels constructed as a common electrode and apply voltages for display to the first electrodes.

Still other embodiments of the present invention will be described below with reference to FIGS. 9 to 12.

Figure 9:
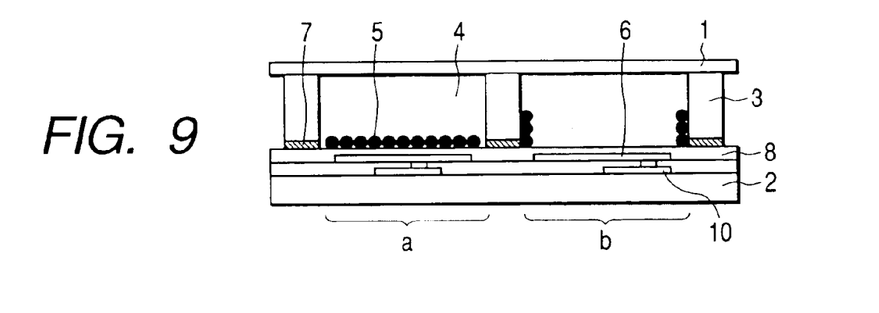
FIG. 9 is a view illustrating another embodiment of the present invention.

An electrophoretic display device in accordance with another embodiment of the present invention is constructed, for example as shown in FIG. 9, such that each pixel is composed of a display-side substrate and a rear-side substrate 1, 2 placed with a predetermined clearance between; a cell wall 3 for retaining the clearance between the substrates 1, 2; a dispersing fluid 4 placed in the space surrounded by the substrates and the cell wall; and a plurality of colored, charged particles 5 dispersed in the dispersing fluid 4. The first electrodes 6 are placed on the rear-side substrate 2.

Figure 11:
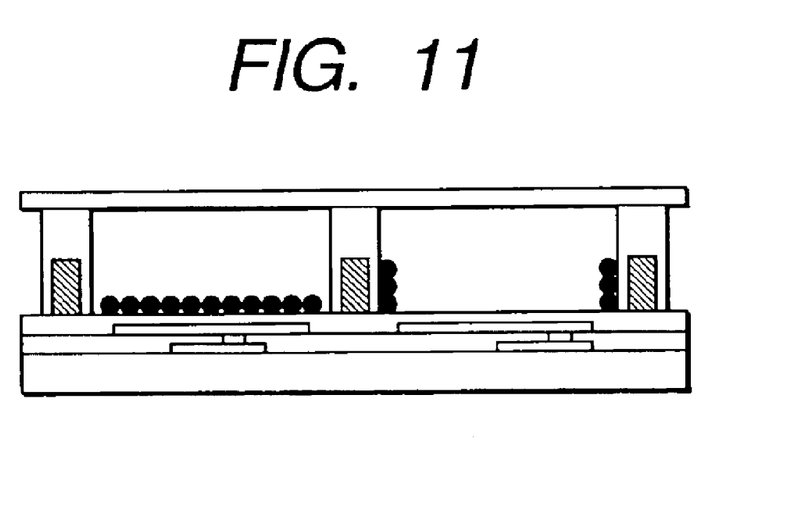
FIG. 11 is a view showing yet another embodiment of the present invention where the second electrode is present inside the cell wall.
Figure 12:
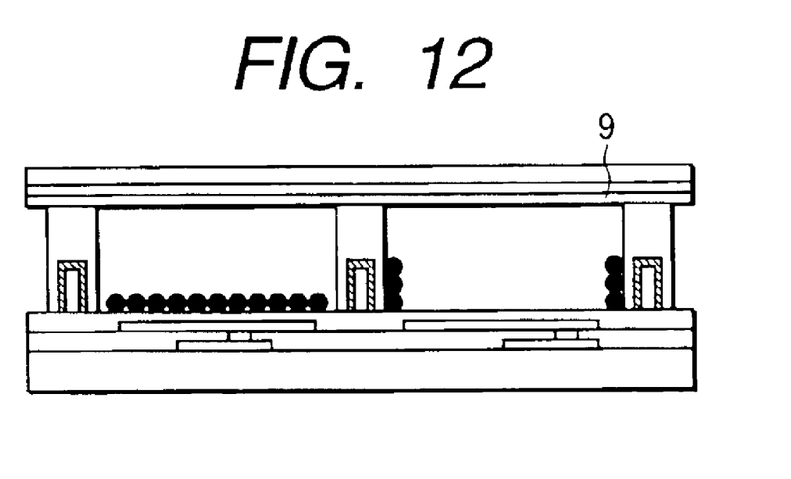
FIG. 12 is a view showing another form of the second electrode inside the cell wall.

The second electrode 7 is located at one or more positions among the location on the side wall of the cell wall 3, i.e., on the dispersing fluid 4 side surface, the location between the cell wall 3 and the display-side substrate 1, and the location between the cell wall 3 and the rear-side substrate 2. The second electrode 7 may also be placed inside or on the surface of the cell wall 3, or may be placed on the display-side substrate 1 or on the rear-side substrate 2 through another layer to the cell wall 3 or inside either of the substrates (FIGS. 10, 11, and 12).

Figure 10:
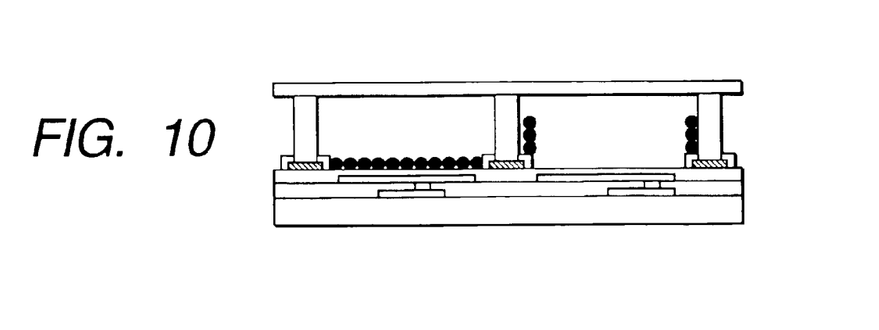
FIG. 10 is a view showing still another embodiment of the present invention where the second electrode is wider than the cell wall.

When the second electrode is formed on the substrate, the second electrode may project out in part from the area corresponding to the bottom face of the cell wall toward the first electrode, as shown in FIG. 10. The provision of this projection permits the charged particles to migrate to spread over a wide area on the side face of the cell wall. In this configuration, where the charged particles are black, they provide the effect like the black matrix to the observer, so as to make the image sharper. If the amount (or length) of the projection is too large on the other hand, the area of the display electrode will become smaller, so as to decrease the aperture ratio, which is not preferable. In order to achieve the above purpose, it is sufficient to exclude the color of the side face of the cell wall, and it can be achieved by the projection of a length of several charged particles arranged linearly; specifically, by the length of three particles arranged linearly.

The first electrode may be configured to have an insulating layer 8 formed on the surface thereof. It is also possible to provide a transparent third electrode 9 on the display-side substrate 1 side, as shown in FIG. 12.

The display device of the present invention is configured to apply a voltage between the first electrode 6 and the second electrode 7 to move the charged particles 5 in the area including the surface of the first electrode 6 and, the side face of the cell wall 3 and the vicinity thereof, thereby implementing display.

For example, a configuration in which positively charged particles are used will be described below with reference to FIG. 9. In the configuration wherein the second electrode 7 is formed between the cell wall 3 and the rear-side substrate 2, when a positive voltage is applied to the first electrode with the second electrode being grounded, the charged particles 5 are collected in the portion surrounded by the side face of the cell wall 3 and the rear-side substrate 2 except for the surface of the first electrode 6. This allows the observer to observe the surface of the first electrode. When the surface of the first electrode is white, white display is provided (as in the portion b in FIG. 9). In this white display, the charged particles are collected in the portion surrounded by the cell wall and the rear-side substrate 2 except for the surface of the first electrode 6, and the particles are located in the vicinity of the rear-side substrate. Therefore, this configuration can greatly reduce the influence of observer's viewing angle. Also, in the configuration wherein the second electrode is formed on the side face of the cell wall, the influence of viewing angle is not so significant, either.

Then, when a negative voltage is applied to the first electrode with the second electrode being grounded, the charged particles 5 spread over the surface of the first electrode 6 (as in the portion a in FIG. 9). This allows the observer to observe the color of the charged particles on the surface of the first electrode. When the color of the second electrode is substantially equal to the color of the charged particles, it becomes feasible to present clear display. For example, where both the charged particles and the second electrode are black, it is feasible to achieve high blackness.

In the present display device, as shown in FIG. 9, each pixel is provided with a switching device 10 such as a thin film transistor or the like for active matrix drive display. In addition thereto, there are provided elements necessary for display (not shown), such as driver IC and others, around conductor lines or the display device. A signal is supplied through the switching device 10 to the first electrode 6 of each pixel. The switching device 10 is preferably configured to be coupled to the bottom part of each first electrode 6, and the second electrodes 7 of the respective pixels are preferably configured to be coupled to each other so as to receive supply of a common signal. Besides, it is preferable to place the elements necessary for the display, such as driver IC and others, around the conductor lines or the display device.

The other structural parts will be described below.

The cell wall is placed so as to surround each pixel at the periphery thereof. This can prevent the charged particles from migrating between pixels. The material of the cell wall can be the same as the material of the substrates, and the cell wall may be made of a photosensitive resin such as an acrylic resin or the like. The cell wall may be made by any method. For example, it can be made by a method of applying a photosensitive resin layer and thereafter performing exposure and wet development thereof, a method of bonding a separately prepared barrier wall, a method of forming it by printing, and so on.

The second electrode is formed on one or more of the side face, the bottom face, and the top face of the cell wall, or inside thereof. The device may be constructed in such a way that the second electrode is first formed on the rear-side substrate and thereafter the cell wall is formed, or in such a way that the second electrode layer is formed on a surface of the cell wall formed on the substrate. The device may also be constructed in such a way that the cell wall with the second electrode layer is placed on the substrate.

In the display method of the present invention, many colored, charged particles are collected on the surface of the cell wall during the white display, and thus the area of the colored, charged particles becomes smaller on a view normal to the display-side substrate, thereby increasing the brightness of the white display and also raising the contrast.

The above description has been made for the example of using the colored, charged particles 3 of black and the surface of the first electrode of white, but the invention is not limited to this example. The combination of colors can be freely determined. For implementing color display, a preferred combination is such that the colored, charged particles 3 are black and the surface of the first electrode is colored in red, green, blue, or the like as needed. As the coloring method, there can be included, for example, the following methods:

1. a method of coloring the electrode itself;
2. a method of providing a color layer separate from the electrode;
3. a method of utilizing an insulating layer formed so as to cover the electrode (e.g., a method of utilizing the color of the insulating layer itself, or a method of mixing a color material in the insulating layer).

The insulating layer is preferably formed so as to cover the electrode, and the insulating layer, if formed, can prevent injection of charge from each electrode into the charged particles. The material used for formation of the insulating layer preferably includes those materials which are resistive to formation of pinhole even when shaped in a thin film and have a low dielectric constant and, specifically, one selected from amorphous fluororesins, highly transparent polyimide, acrylic resins, and so on.

In the present display device, as shown in FIG. 1, each pixel is provided with the switching device 10 such as a thin film transistor or the like for active matrix drive display. In addition thereto, there are provided the elements necessary for the display (not shown), such as the driver IC and others, around the conductor lines or the display device. A signal is supplied through the switching device 10 to the first electrode 6 of each pixel. The switching device 10 is preferably configured to be coupled to the bottom part of each first electrode 6, and the second electrodes 7 of the respective pixels are configured to be coupled to each other so as to receive supply of a common signal, in order to avoid interference between adjacent pixels, as described above. Besides, it is preferable to place the elements necessary for the display, such as the driver IC and others, around the conductor lines or the display device.

The other structural parts will be described. The protruding portion may be made of one selected from photo-setting resins, thermosetting resins, thermoplastic resins, and so on, and the electrode material itself may be formed so as to have a protrusion.

The cell wall is placed so as to surround each pixel at the periphery thereof. This can prevent the charged particles from migrating between pixels. The material of the cell wall can be the same as the material of the substrates, or may be a photosensitive resin such as an acrylic resin or the like. The cell wall may be made by any method. For example, the cell wall can be made by one selected from the method of applying the photosensitive resin layer and thereafter performing exposure and wet development, the method of bonding a barrier wall prepared separately, the method of forming it by printing, and so on.

The second electrode is formed on one or more of the side face, the bottom face, and the top face of the cell wall, or inside thereof. The device may be constructed in such a way that the second electrode is first formed on the rear-side substrate and thereafter the cell wall is formed, or in such a way that the second electrode layer is formed on the surface of the cell wall formed on the substrate. The device may also be constructed in such a way that the cell wall with the second electrode layer preliminarily formed is placed on the substrate.

The substrates can be a plastic film of polyethylene terephthalate (PET), polycarbonate (PC), polyether sulfone (PES), or the like, and can also be made of glass, quartz, or the like. The display-side substrate needs to be made of a transparent material, while the rear-side substrate may be made of a colored material of polyimide (PI) or the like.

The material of the first and second electrodes can be any patternable conductive material. For example, it includes metals such as titanium (Ti), aluminum (Al), copper (Cu), etc., carbon, a silver paste, organic conductive films, and so on. In a case where the first electrode is utilized also as a light reflecting layer, it is preferable to use one of materials with high reflectance such as silver (Ag), Al, and so on. When the first electrode is used to display white, the electrode surface itself is roughened so as to irregularly reflect light, or a light scattering layer is formed on the electrode.

The dispersing fluid 2 as preferably used includes a transparent fluid such as isoparaffins, silicone oil, and nonpolar solvents such as xylene or toluene, and so on.

Furthermore, the charged particles are preferably of a colored material that demonstrates good charging characteristics in the positive polarity or the negative polarity in the dispersing fluid. For example, it is preferable to use one of various inorganic pigments, organic pigments, carbon black, or resins containing these materials. The sizes of the particles can be normally determined in the range of approximately 0.01 $\mu$m to 50 $\mu$m and preferably in the range of approximately 0.1 $\mu$m to 10 $\mu$m.

It is preferable to incorporate a charge control agent for controlling and stabilizing the charge on the charged particles, into the foregoing dispersing fluid and/or the charged particles. The charge control agent can be one selected from metal complex salts of monoazo dyes, salicylic acid, organic quaternary ammonium salts, nigrosine based compounds, and so on.

Further, it is also preferable to add a dispersant for preventing aggregation of the charged particles to maintain a dispersed state thereof in the dispersing fluid. As the dispersant, there can be used polyvalent metal phosphates such as calcium phosphate, magnesium phosphate, etc., carbonates such as calcium carbonate and the like, other inorganic salts, inorganic oxides, organic polymer materials, and so on.

The following will describe the effects of the present embodiment.

According to the present embodiment, the first electrode is placed on one substrate and part or all of the first electrode protrudes toward the facing substrate. This protrusion can structurally eliminate the portion where the electric field becomes weakest under application of the voltage between the first electrode, and the second electrode formed at the cell wall part beside the first electrode, so as to be able to decrease the drive voltage and/or enhance the contrast. When the first electrode is formed on the rear-side substrate, because the central region of the pixel is protruding toward the display surface, the light as reflected by the protruding portion is emphasized when the display surface is observed obliquely relative to the substrate. Therefore, the dependence on the viewing angle can be decreased.

Furthermore, since the pixel switching devices and the driving wiring are formed below the first and the second electrodes, it is feasible to prevent the migration of the charged particles due to the electric field leaked out from the wiring and others.

EXAMPLES

The present invention will be further described below in detail with reference to examples thereof.

Example 1

The present example will describe a method of fabricating the electrophoretic display device shown in FIG. 1. The display device to be fabricated includes 200×200 pixels and the size of each pixel is 120 $\mu$m×120 $\mu$m. The cell wall surrounds each pixel at the periphery thereof. The cell wall is structured in the width (or thickness) of 10 $\mu$m and in the height of 20 $\mu$m. The first electrode of each pixel is located in the central region of the portion surrounded by the cell wall and the length of each edge is 100 $\mu$m. Furthermore, the central region of the first electrode has a protruding structure. The protrusion is shaped in the height of 10 $\mu$m and in the length of each edge of 20 $\mu$m. The surface of the protrusion is a curved surface. The second electrode of each pixel is located on the bottom surface of the cell wall, i.e., between the rear-side substrate and the cell wall.

The following will describe the method of producing the electrophoretic display device according to the present example.

The rear-side substrate, which is the lower substrate in the figure, is a glass plate of 1.1 mm in thickness, and the switching devices 10, and the other conductor lines (not shown), IC, etc. necessary for driving are formed on the rear-side substrate.

Then, the protruding portions are formed of a photosetting resin on the rear-side substrate. Then, the first electrodes are formed on the protruding portions and the first electrodes are coupled to the switching devices on the rear-side substrate. The material of the first electrodes used is aluminum with a high reflectance. The first electrodes are covered with an acrylic resin layer containing fine particles of titanium oxide. In the present example, each first display electrode also serves as a light reflecting layer and the acrylic resin layer exhibits the light scattering effect.

A second electrode layer is formed in the border region of the pixels and the cell wall is formed thereon. Then, the pixels are filled with the dispersing fluid and the charged particles. The dispersing fluid is an isoparaffin (trade name: Isopar, manufactured by Exxon Corp.) and the charged particles are of a polystyrene-polymethylmethacrylate copolymer resin containing carbon black of particle sizes of approximately 1 to 2 $\mu$m. The isoparaffin contains succinimide (trade name: OLOA1200, manufactured by Chevron Corp.) as a charge control agent. Then, the display-side substrate is placed on the cell wall.

In the display device fabricated by the above method, the protruding portion of the first electrode in the central region of each pixel provides the effect of enhancing the electric field in the central region of the pixel where the electric field is primarily weakest, so that it is feasible to greatly decrease the particles that cause degradation of the contrast by remaining in the central region of each pixel during the display operation, for example, during the white display. Further, because the central region of each display pixel protrudes toward the display surface, the light as reflected by the protruding portion is emphasized when the display surface is obliquely observed relative to the substrate. Therefore, the dependence on the viewing angle can be reduced.

Example 2

Figure 2A:
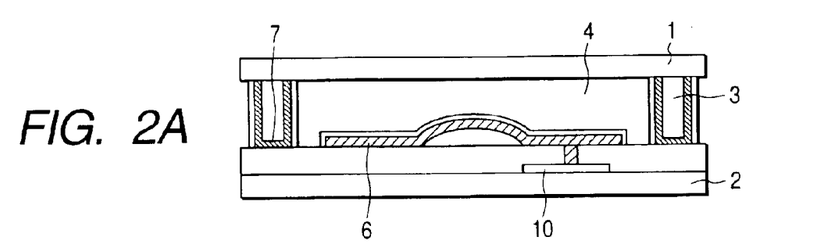
FIGS. 2A, 2B, 2C and 2D are views showing other embodiments of the present invention.

In the present example the electrophoretic display device shown in FIG. 2A is fabricated in a method similar to that in Example 1.

The present example is characterized in that each second electrode is formed on the side and the bottom faces of the cell wall. The shape of the first electrodes and others are substantially the same as those in Example 1. When the second electrode is formed on the side face of the cell wall, the electric field becomes stronger and more uniform in each pixel space surrounded by the display-side and the rear-side substrates and the cell wall, so that the particles that cause the degradation of the contrast by remaining in the central region of each pixel during the display operation, e.g., during the white display, can be reduced greatly.

Example 3

Figure 2B:
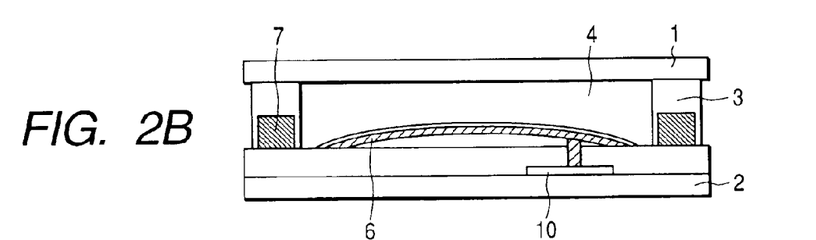
Figure 2C:
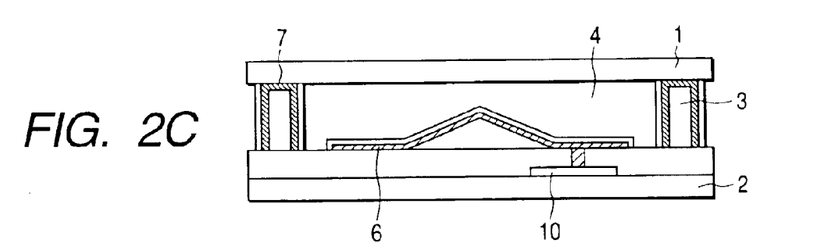
Figure 2D:
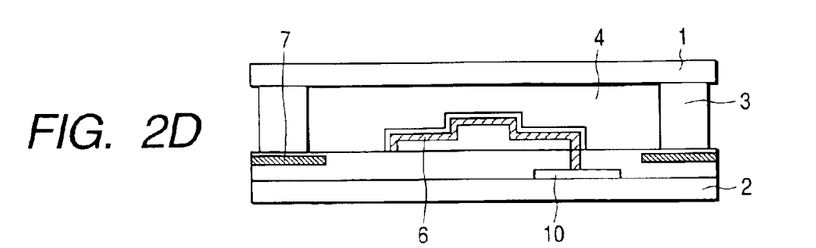

In the present example, the electrophoretic display devices with the structures of the first electrode shown in FIGS. 2B, 2C, and 2D are fabricated. FIG. 2B shows the structure in which the protrusion is formed over the entire surface of the first electrode and in which the second electrode is formed inside the cell wall. FIG. 2C shows the structure in which the central region of the protruding portion of the first electrode is angled so as to facilitate orientation of electric field vectors toward the second electrode and in which the second electrode is formed on the side and the top faces of the cell wall. FIG. 2D shows the structure in which the protruding portion is formed stepwise in the central region of the first electrode and in which the second electrode is formed inside the rear-side substrate. These structures exhibit the effects similar to those in Example 1.

Because the central part of each display pixel is protruding toward the display surface, the light as reflected by the protruding portion is emphasized when the display surface is observed obliquely relative to the substrate. Therefore, the dependence on the viewing angle can be reduced.

Another aspect of the present invention will be further described in detail with reference to other examples.

Example 4

The present example will describe a method of fabricating the electrophoretic display device shown in FIG. 9.

The display device to be fabricated includes 200×200 pixels and the size of each pixel is 120 $\mu$m×120 $\mu$m, as in Example 1. The cell wall surrounds each pixel at the periphery thereof. The cell wall is structured in the width (or thickness) of 8 $\mu$m and the height of 20 $\mu$m. The first electrode of each pixel is located in the central area of the portion surrounded by the cell wall, and the length of each edge thereof is 100 $\mu$m. The second electrode of each pixel is located on the bottom face of the cell wall, i.e., between the rear-side substrate and the cell wall.

The following will describe the method of producing the electrophoretic display device according to the present example.

The rear-side substrate, which is the lower substrate in the figure, is a glass plate of 1.1 mm in thickness, and the switching devices 10, and the other conductor lines (not shown), IC, etc. necessary for driving are formed on the rear-side substrate.

Then, the surface of the rear-side substrate is coated with an insulating layer, contact holes are formed therein, and the first electrodes are formed thereon, whereby the first electrodes are coupled to the respective switching devices on the rear-side substrate. The material of the first electrode is aluminum with a high reflectance.

Then, an acrylic resin layer containing fine particles of titanium oxide is laid on the first electrodes. In the present example, each first display electrode also serves as a light reflecting layer and the acrylic resin layer exhibits the light scattering effect.

The second electrode layer is formed in the boundary portion of the pixels and a black color layer is formed thereon. Then, the cell wall is further formed at the same location. Each pixel is filled with the dispersing fluid and the charged particles. The dispersing fluid is an isoparaffin (trade name: Isopar, manufactured by Exxon Corp.), and the charged particles are of a polystyrene-polymethylmethacrylate copolymer resin containing carbon black of particle sizes of approximately 1 to 2 $\mu$m. The isoparaffin contains succinimide (trade name: OLOA1200, manufactured by Chevron Corp.) as a charge control agent. Then, the display-side substrate is placed on the cell wall.

The display device fabricated by the above method is configured to apply the voltage between the first electrode and the second electrode to move the charged particles in the area including the surface of the first electrode and, the side face of the cell wall and the vicinity thereof, thereby implementing display. Since the second electrode and the charged particles are black, it is feasible to achieve extremely high blackness in the black display where the charged particles spread over the first electrode. In the white display where the charged particles are collected in the vicinity of the second electrode, the particles are located in the vicinity of the rear-side substrate, so that the influence of observer's viewing angle on the image can be made very small.

Example 5

In the present example the electrophoretic display device shown in FIG. 10 is fabricated by a method similar to that in Example 4. In the present example, the second electrode and the color layer formed between the cell wall and the rear-side substrate have such a width as to project a little out from the side face of the cell wall. The shape of the first electrodes and others are substantially the same as those in Example 4.

The charged particles are of a polystyrene-polymethylmethacrylate copolymer resin containing carbon black of an average particle size of approximately 1.5 $\mu$m which is black. In this case, the amount (or length) of the projection from the side face of the cell wall is preferably approximately three times the average particle size of the particles in terms of the aperture ratio and the shielding (or eliminating) rate of the color of the side face of the cell wall, and in the present example the design value thereof is 4.5 $\mu$m, which is three times the average particle size.

The display device fabricated in the present example is configured to apply the voltage between the first electrode and the second electrode to move the charged particles in the area including the surface of the first electrode and, the side face of the cell wall and the vicinity thereof, thereby implementing display. It is also feasible to achieve extremely high blackness during the black display, as in Example 1. In the white display where the charged particles are collected in the vicinity of the second electrode, the particles are located in the vicinity of the rear-side substrate to demonstrate the black matrix effect of pixel, thereby improving the sharpness of the image. Since it becomes easier for the particles to be located on the rear-side substrate side, the influence of observer's viewing angle on the image can be made very small.

The conventional device required the shielding film placed outside the substrate in order to reduce the influence of light at the periphery of each pixel, whereas the present invention obviated the need for the shielding film.

Example 6

In the present example the electrophoretic display device shown in FIG. 11 is fabricated. In the present example, the second electrode of each pixel is formed in a considerable thickness so as to constitute a part of the cell wall. The surface of each second electrode is covered by a black, insulating film. The shape of the first electrodes is substantially the same as in Example 1. A color layer of red, blue, or green is formed on the first electrode in each pixel so as to enable color display.

The display device fabricated in the present example is configured to apply the voltage between the first electrode and the second electrode to move the charged particles in the area including the surface of the first electrode and, the side face of the cell wall and the vicinity thereof, thereby implementing display. It is thus feasible to achieve extremely high blackness during the black display, as in Example 4. In the color display where the charged particles are collected in the vicinity of the second electrode, the particles are located in the vicinity of the rear-side substrate, so that the influence of observer's viewing angle on the image can be made very small.

Since it becomes easier for the black particles to be located on the cell wall surface during color display, the observer can observe the image with the black matrix effect to see the contour of the image clear, which is preferable. For this reason, there is no need for the shielding film conventionally disposed in the outside region of the substrate.

According to the present invention, the first electrode is placed on one substrate and a part or all of the first electrode protrudes toward the facing substrate. This protrusion makes it feasible to structurally eliminate the portion where the electric field is weakest during application of the voltage between the first electrode, and the second electrode formed in the cell wall portion beside the first electrode, and is thus able to decrease the drive voltage and/or enhance the contrast as a result.

Furthermore, since the pixel switching device and the driving conductor lines are formed below the first electrode and the second electrode, it is feasible to prevent the migration of the charged particles due to the electric field leaked out from the conductor lines and others.

The display device of the present invention is configured to apply the voltage between the first electrode and the second electrode to move the charged particles in the area including the surface of the first electrode and, the side face of the cell wall and the vicinity thereof, thereby implementing display. In the configuration wherein the color of the second electrode is substantially the same as the color of the charged particles, when the charged particles spread over the first electrode to display the color of the charged particles, the display device is able to present a higher color purity. In a state of display where the charged particles are collected in the vicinity of the second electrode to expose the surface of the first electrode, the particles are located in the vicinity of the rear-side substrate, so that the influence of observer's viewing angle can be made very slight.

What is claimed is:

1. An electrophoretic display device comprising:
   a display-side substrate and a rear-side substrate positioned with a predetermined clearance therebetween;
   a cell wall placed at a periphery of a pixel in order to keep the clearance constant between the two substrates;
   a dispersing fluid placed in the clearance between the two substrates;
   a plurality of colored, charged particles dispersed in the dispersing fluid;
   a first electrode placed in each pixel; and
   a second electrode placed at a periphery of each pixel and demonstrating a color different from a color of the first electrode,
   wherein a voltage is applied between the first electrode and the second electrode to move the charged particles between a surface of the first electrode and a side face of the cell wall and the vicinity thereof, thereby implementing display, and
   wherein the first electrode is formed on the rear-side substrate and the second electrode is formed at one or more positions among a location between the cell wall and the display-side substrate, a location between the cell wall and the rear-side substrate, and a location inside the cell wall.

2. The electrophoretic display device according to claim 1, wherein the color of the second electrode is substantially the same as the color of the charged particles.

3. The electrophoretic display device according to claim 1, wherein the second electrode has a pattern with a projection from the side face of the cell wall.

4. The electrophoretic display device according to claim 1, wherein the color of the charged particles is black and the particles are made to migrate to the side face of the cell wall and the vicinity thereof, thereby making the side face of the cell wall appear black.

5. The electrophoretic display device according to claim 1, wherein at least a portion of the first electrode has a shape protruding on a side opposite to the rear-side substrate side.

6. The electrophoretic display device according to claim 5, wherein the protruding shape of the first electrode is such a shape as to make the intensity of an electric field at the protruding portion stronger under application of the voltage between the first electrode and the second electrode than that for a flat shape having no protrusion.

7. The electrophoretic display device according to claim 5, wherein the protruding portion of the first electrode includes a position on the first electrode where the intensity of an electric field is weakest under application of the voltage between the first electrode and the second electrode in a flat shape having no protrusion.

8. The electrophoretic display device according to claim 5, wherein the protruding shape of the first electrode is such a shape as to slope toward the cell wall from a highest point at a position on the first electrode where the intensity of an electric field is weakest.

9. The electrophoretic display device according to claim 5, wherein the height of a highest point of the protrusion, measured from the surface of the substrate on which the first electrode is formed, is not less than 0.5 $\mu$m.

10. The electrophoretic display device according to claim 9, wherein the height of the highest point is not less than 2 $\mu$m.

11. The electrophoretic display device according to claim 5, wherein the height of a highest point of the protrusion, measured from the surface of the substrate on which the first electrode is formed, is not more than a distance between the substrates.

12. The electrophoretic display device according to claim 11, wherein the height of the highest point is not more than two thirds of the distance between the substrates.

13. The electrophoretic display device according to claim 1, wherein the first electrode is formed with a material of high reflectance covered by an insulating layer which exhibits a light scattering effect.

14. The electrophoretic display device according to claim 13, wherein the cell wall and the second electrode is formed on the insulating layer covering the first electrode.

15. The electrophoretic display device according to claim 2, wherein the color of the second electrode and the color of the charged particles are black.

16. An electrophoretic display device comprising:

a display-side substrate and a rear-side substrate positioned with a predetermined clearance therebetween;

a cell wall placed at a periphery of a pixel in order to keep the clearance constant between the two substrates;

a dispersing fluid placed in the clearance between the two substrates;

a plurality of colored, charged particles dispersed in the dispersing fluid;

a first electrode placed in each pixel; and a second electrode placed at a periphery of each pixel and demonstrating a color different from a color of the first electrode, wherein a voltage is applied between the first electrode and the second electrode to move the charged particles between a surface of the first electrode and a side face of the cell wall and the vicinity thereof, thereby implementing display, and wherein the first electrode is formed on the rear side substrate and the second electrode is formed on the side surfaces and a top or a bottom surface of the cell wall.

17. The electrophoretic display device according to claim 16, wherein a common fixed potential is applied to the second electrode.

* * * * *

UNITED STATES PATENT AND TRADEMARK OFFICE
CERTIFICATE OF CORRECTION

PATENT NO. : 6,897,996 B2
DATED : May 4, 2005
INVENTOR(S) : Tsutomu Ikeda et al.

It is certified that error appears in the above-identified patent and that said Letters Patent is hereby corrected as shown below:

<u>Column 2,</u>
Line 1, "degraded" should read -- degrades --.

Signed and Sealed this

Eighteenth Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,897,996 B2 Page 1 of 1
DATED : May 24, 2005
INVENTOR(S) : Tsutomu Ikeda et al.

It is certified that error appears in the above-identified patent and that said Letters Patent is hereby corrected as shown below:

<u>Column 2,</u>
Line 1, "degraded" should read -- degrades --.

This certificate supersedes Certificate of Correction issued April 18, 2006.

Signed and Sealed this

Ninth Day of May, 2006

JON W. DUDAS
*Director of the United States Patent and Trademark Office*